US012567685B2

(12) United States Patent
Owen

(10) Patent No.: US 12,567,685 B2
(45) Date of Patent: Mar. 3, 2026

(54) GROUND ROD SYSTEM

(71) Applicant: Ohm Electric Company, Rogersville, TN (US)

(72) Inventor: Benjamin Owen, Rogersville, TN (US)

( * ) Notice: Subject to any disclaimer, the term of this patent is extended or adjusted under 35 U.S.C. 154(b) by 257 days.

(21) Appl. No.: 18/354,305

(22) Filed: Jul. 18, 2023

(65) Prior Publication Data

US 2025/0030182 A1 Jan. 23, 2025

(51) Int. Cl.

| | |
|---|---|
| ***H01R 4/00*** | (2006.01) |
| ***H01B 1/02*** | (2006.01) |
| ***H01B 1/04*** | (2006.01) |
| ***H01R 4/36*** | (2006.01) |
| ***H01R 4/66*** | (2006.01) |
| ***H01R 43/20*** | (2006.01) |

(52) U.S. Cl.

CPC ................ *H01R 4/66* (2013.01); *H01B 1/02* (2013.01); *H01B 1/04* (2013.01); *H01R 4/36* (2013.01); *H01R 43/20* (2013.01)

(58) Field of Classification Search

CPC . H01R 4/66; H01R 4/36; H01R 43/20; H01B 1/02; H01B 1/04

See application file for complete search history.

(56) References Cited

U.S. PATENT DOCUMENTS

| | | | | |
|---|---|---|---|---|
| 2004/0154814 A1* | 8/2004 | Brennan | .................. | H01R 4/66 174/6 |
| 2008/0257113 A1* | 10/2008 | Neumarkel | .............. | B25D 1/16 81/27 |
| 2021/0044034 A1* | 2/2021 | LaBarge | .................. | H01R 4/62 |
| 2023/0387612 A1* | 11/2023 | Boling | ..................... | H01R 4/36 |

FOREIGN PATENT DOCUMENTS

| | | |
|---|---|---|
| CN | 204289735 U | 4/2015 |
| CN | 211530208 U | 9/2020 |
| JP | 2003217701 A | 7/2003 |
| KR | 101568782 B1 | 11/2015 |
| WO | 2008143421 A1 | 11/2008 |

OTHER PUBLICATIONS

VOSS.farming Ground Rod, 80 cm, Ideal for Temporary & Mobile Fences, Website link: "https://www.electric-fence.co.uk/voss-farming-ground-rod-80-cm", Retrieved on Jul. 12, 2023, pp. 4.

(Continued)

*Primary Examiner* — Pete T Lee

(74) *Attorney, Agent, or Firm* — Briggs Intellectual Property Law; Jeremy A. Briggs

(57) ABSTRACT

A ground rod for earthing is disclosed. The ground rod may include a rod body having a top end and a bottom end. The ground rod may further include a clamp configured to hold a ground wire. The clamp may be integrated at the top end to form a unitary structure of the ground rod. The clamp may include an attachment mechanism configured to secure the ground wire in the clamp. Furthermore, the rod body may include a spiral portion disposed between the top end and the bottom end. The spiral portion may enable a user to conveniently insert the ground rod in the ground.

16 Claims, 5 Drawing Sheets

(56) References Cited

OTHER PUBLICATIONS

Frost Ground Rod Spiral Auger 36" X 7/8" BIT M0078803 NOS Free Shipping, Website link: "https://www.ebay.com/itm/303819747305", Retrieved on Jul. 12, 2023, pp. 4.
Linian Earth Rod Pro™ Bit, Carbide Tip (1LERPB), Website link: "https://linianclip.co.uk/products/linian-earth-rod-pro%E2%84%A2-bit-carbide-tip", Retrieved on Jul. 12, 2023, pp. 2.
Rebar Grounding Clamp, Perpendicular, Website link: "https://www.nvent.com/en-us/erico/products/rebar-grounding-clamp-perpendicular-0", Retrieved on Jul. 12, 2023, pp. 2.
Single Bolt Grounding Clamp—Lay in Lug, Website link: "https://www.bptfittings.com/store/single-bolt-grounding-clamp-lay-in-lug.htm", Retrieved on Jul. 12, 2023, pp. 5.

* cited by examiner

GROUND ROD SYSTEM

TECHNICAL FIELD

The present disclosure relates to a ground rod system, and more specifically to a ground rod having an integrated clamp to hold a ground wire.

BACKGROUND

Grounding is typically required to pass leakage current to earth and prevent equipment and personnel from damage (e.g., due to overcurrent or surge). To achieve grounding, a ground wire from an equipment is typically connected to the ground. The ground wire is generally connected to the ground via a ground rod (also known as earthing rod). The ground rod is installed inside the ground and may have high resistivity to current.

Conventional ground rods are difficult to install inside the ground. In general, an installer may be required to use a heavy hammer and hit the ground rod multiple times to insert the ground rod into the ground. Such a process of inserting the ground rod into the ground requires a lot of physical effort and time. In addition, digging of the ground to install the ground rod may be dangerous and may cause injury. Further, the hammer may sometimes damage the ground rod itself.

Thus, there is a need for a ground rod that may be easily installed in the earth.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
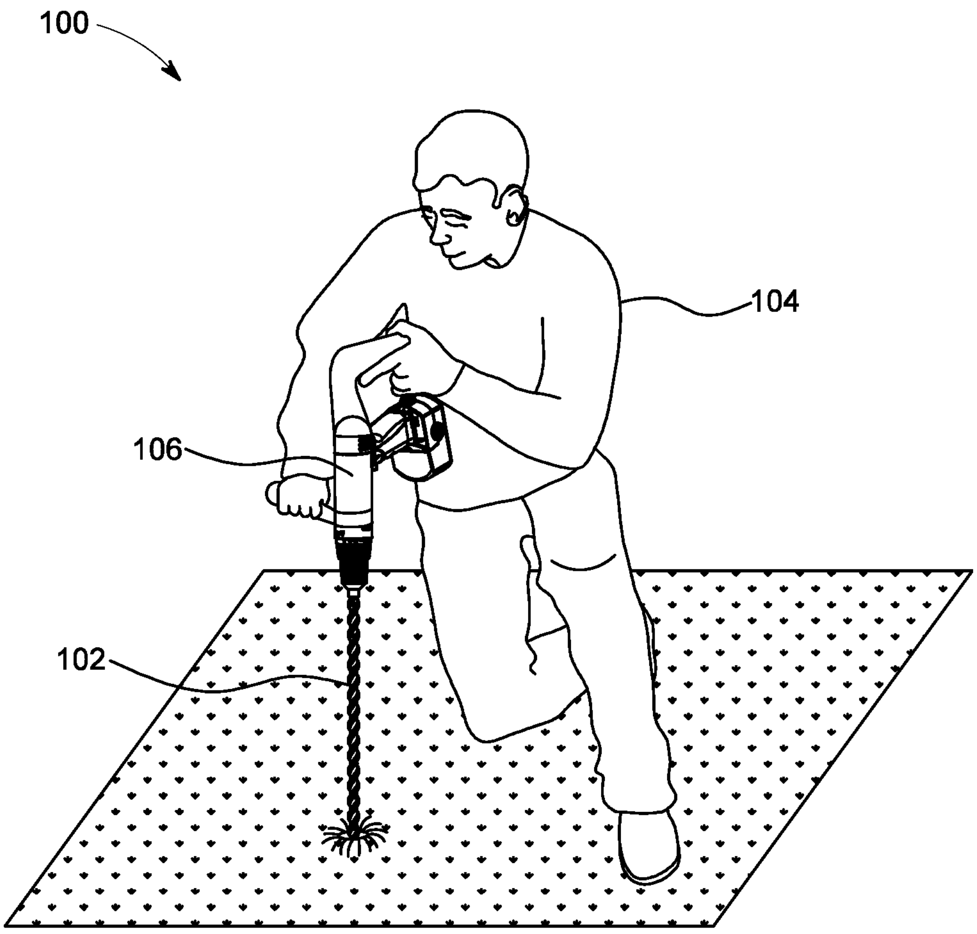
FIG. 1 depicts an example environment in which techniques and structures for providing the systems and methods disclosed herein may be implemented.

The present disclosure is directed towards a ground rod that may be conveniently installed in the ground and used to secure a ground wire. The ground rod may include a rod body having a spiral portion. The spiral portion may cover a predetermined length of the rod body, which may enable an installer to conveniently insert the ground rod into the ground. The rod body may further include a shank or a head that may be disposed towards a rod body top end. The shank may be configured to be attached to a drive machine (e.g., a drill machine) that may be used to drill the ground and insert the ground rod into the ground. In some aspects, a shank cross-section may be hexagonal in shape, which may enable the installer to conveniently attach the shank with a conventional drive machine. The rod body may further include a bottom end that may include a driving/drilling tip or cutting edge configured to cut rock/ground.

In some aspects, the spiral portion may extend throughout a rod body length, between the shank and the bottom end. In other aspects, the spiral portion may cover a portion of the rod body length.

The ground rod may be of any material. In some aspects, the spiral portion may be made of copper clad steel (or any other electrically conductive material). The bottom end may be made of a material with an associated tensile strength greater than a predefined threshold. Stated another way, the bottom end may be made of high tensile material. For example, the bottom end may be made of carbide, which may enable the bottom end to easily cut rock/ground and create a hole in the ground. The shank may be made of any material including, but not limited to, steel, aluminum, and/or the like.

The ground rod may further include an integrated clamp that may be configured to hold and secure a ground wire. Stated another way, the integrated clamp may facilitate connection of the ground wire with the ground rod. In some aspects, the clamp may be disposed in proximity to a rod body top end. For example, the clamp may be disposed below the shank and in a rod body top portion. The clamp may be of any shape. In some aspects, the clamp may be a half U-shaped clamp or an L-shaped clamp that may extend from a rod body exterior surface (e.g., from one side of the rod body exterior surface). The clamp may be disposed on the rod body such that the clamp may form an open portion between the rod body and the clamp. The open portion may be formed at a clamp upper side, and may be configured to receive and secure the ground wire. In some aspects, the ground wire may pass through the open portion such that a ground wire longitudinal axis may be perpendicular to a rod body longitudinal axis and parallel to the ground. In further aspects, the ground wire may be secured in the clamp by using a bolt or any other attachment means. A bolt longitudinal axis may be disposed perpendicular to the rod body longitudinal axis.

The present disclosure discloses a ground rod that may be easily installed in the ground. The installer may simply attach the ground rod to the drive machine and activate the drive machine to insert the ground rod into the ground. When the drive machine is activated, the bottom end (made of carbide) may easily create a hole in the ground, which may enable the ground rod to easily insert into the ground. When the ground rod is inserted in the ground, the installer may detach the ground rod from the drive machine so that the ground rod may remain buried in the ground. The installer may then conveniently connect the ground wire to the ground rod via the clamp (and the bolt).

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 2:
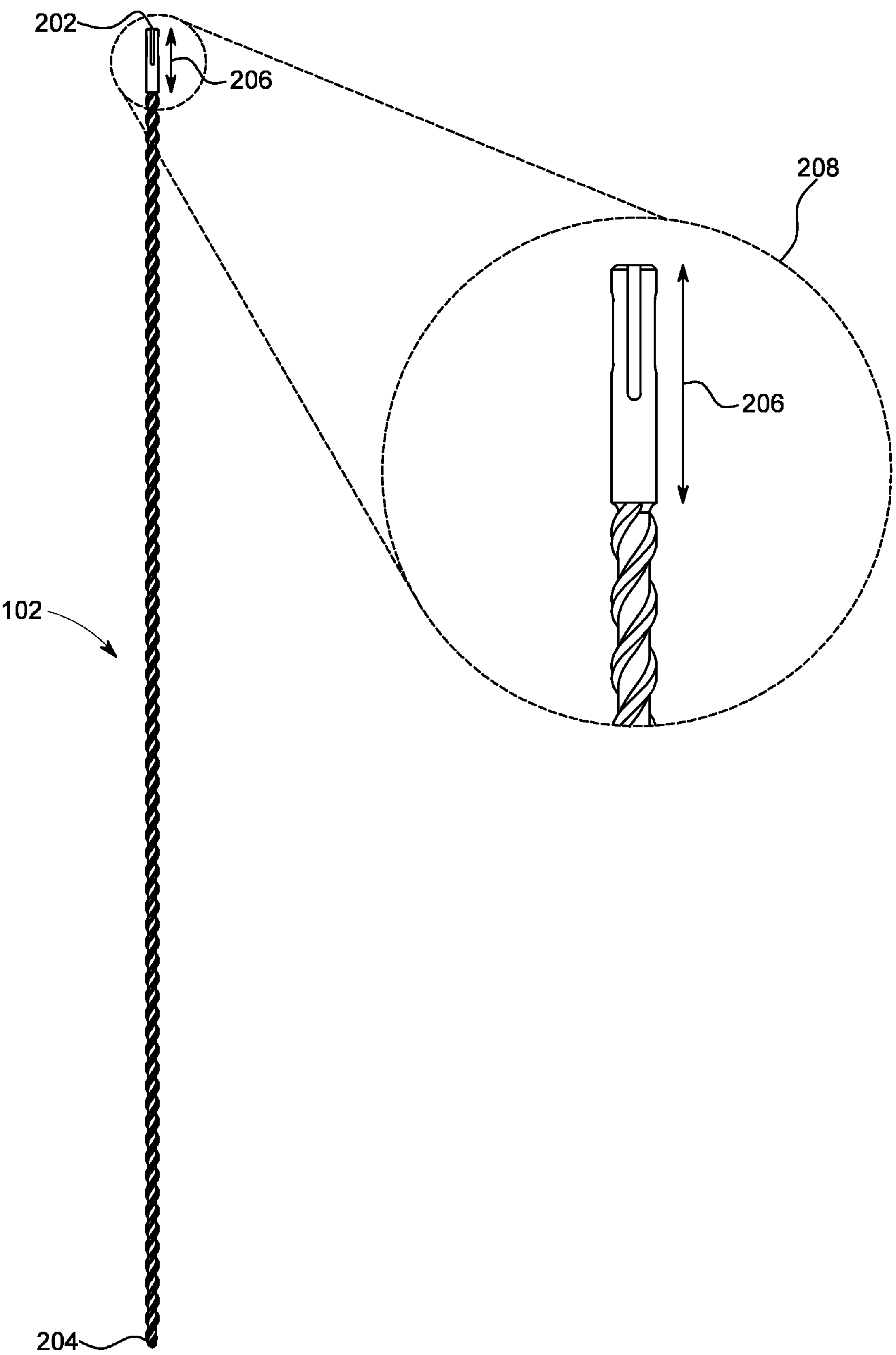
FIG. 2 depicts a first example ground rod in accordance with the present disclosure.
Figure 3:
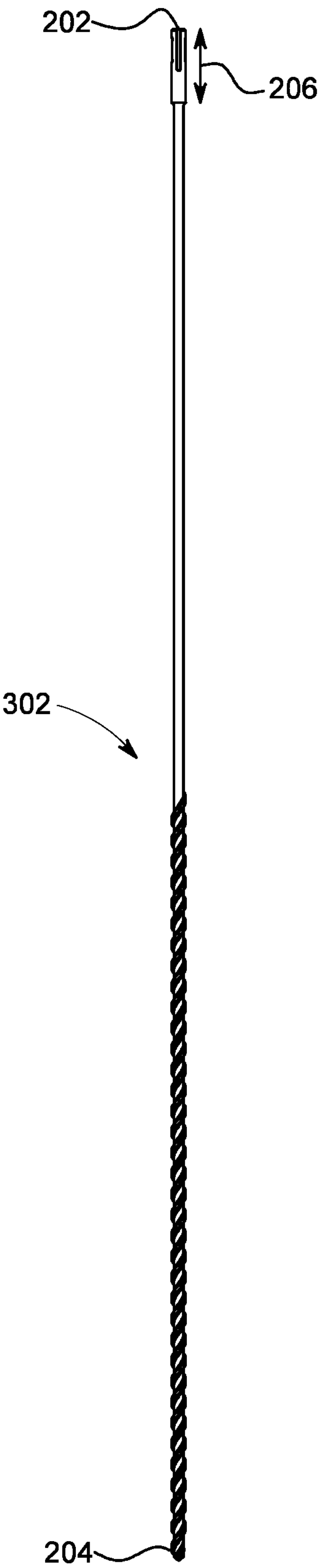
FIG. 3 depicts a second example ground rod in accordance with the present disclosure.

FIG. 1 depicts an example environment 100 in which techniques and structures for providing the systems and methods disclosed herein may be implemented. FIG. 1 will be described in conjunction with FIGS. 2 and 3. FIG. 2 depicts a first example ground rod 102 and FIG. 3 depicts a second example ground rod 302.

The environment 100 may include the ground rod 102 (or an earth rod) that may be installed by an installer 104 in ground. The ground rod 102 may be a bar or a rod that may be configured to connect a grounding system (e.g., a ground wire 404 shown in FIG. 4) of electrical systems (e.g., equipment or electrical device) to the ground, and pass leakage current to earth to prevent equipment and personnel from damage. The ground rod 102 may be configured to be attached to a drive machine 106 (or any other tool/equipment). The drive machine 106 may be a motor driven machine and may install the ground rod 102 in the ground. The drive machine 106 may include, but is not limited to, a drill machine (e.g., Slotted Drive System (SDS) drill), a hammer drill, and/or the like.

The ground rod 102 may include a rod body that may be cylindrical in shape. The rod body may be made of any dimension. For example, a rod body length may be in a range of four to eight feet. The rod body may include a top end 202 and a bottom end 204 (as shown in FIG. 2). The top end 202 may be configured to be attached to the drive machine 106, and the bottom end 204 may be configured to cut the ground and be inserted into the ground.

The rod body may further include a shank 206 (or a head or chuck) that may be disposed at the top end 202. The shank 206 may be configured to be attached to the drive machine 106 (e.g., directly or via a coupler), and secure the ground rod 102 to the drive machine 106. In some aspects, a shank cross-section may be hexagonal in shape (as shown in view 208 of FIG. 2) such that the shank 206 may conveniently attach to the drive machine 106 or any other conventional drive machine. In further aspects, a shank diameter that may be equivalent to a diameter of a drive machine inlet socket in which the shank 206 is inserted. In an exemplary aspect, the shank diameter may be in a range of 0.5 to 0.8 inches. In some aspects, the shank diameter may be greater than (or equivalent to) a rod body diameter. The shank 206 may be made of any material including, but not limited to, steel or aluminum. In some aspects, the shank 206 may be straight or tapered in shape.

The bottom end 204 may be a drilling/driving tip or cutting edge configured to cut rock/ground. The bottom end 204 may be of any shape (e.g., the bottom end 204 may be wedge-shaped) and may include a sharp spur or blunt end. The bottom end 204 may be made of a material with an associated tensile strength greater than a predefined threshold. Stated another way, the bottom end 204 may made of a high tensile material. For example, the bottom end 204 may be made of carbide. The carbide tip assists the installer 104 to install the ground rod 102 conveniently in the ground.

In further aspects, the rod body may include a spiral portion (or spiral flute pattern) at a rod body exterior surface, between the top end 202 and the bottom end 204. The spiral portion may cover a predetermined length of the rod body. In some aspects, the spiral portion may include protrusions on a rod body exterior surface, which may be integrated to the rod body. The protrusions may be in spiral shape and may be disposed circumferentially along a longitudinal direction. The spiral portion facilitates in the ground rod installation as the ground rod 102 may be rotated by the drive machine 106 to dig inside the ground and may not require pounding with a hammer.

In an exemplary aspect, the spiral portion may extend from the bottom end 204 to the top end 202 along a rod body length, as depicted in FIG. 2. In another aspect, the spiral portion may cover a portion of the rod body length. For example, in the ground rod 302 depicted in FIG. 3, the spiral portion may extend from the bottom end 204 and may cover half length of the rod body. The spiral portion may be made of any material. In a preferred aspect, the spiral portion may be made of copper clad steel. In other aspects, the spiral portion may be made of any other electrically conductive material. In some aspects, the spiral portion may include annular threads present at the rod body exterior surface. In further aspects, the spiral portion may include auger threads.

Figure 4:
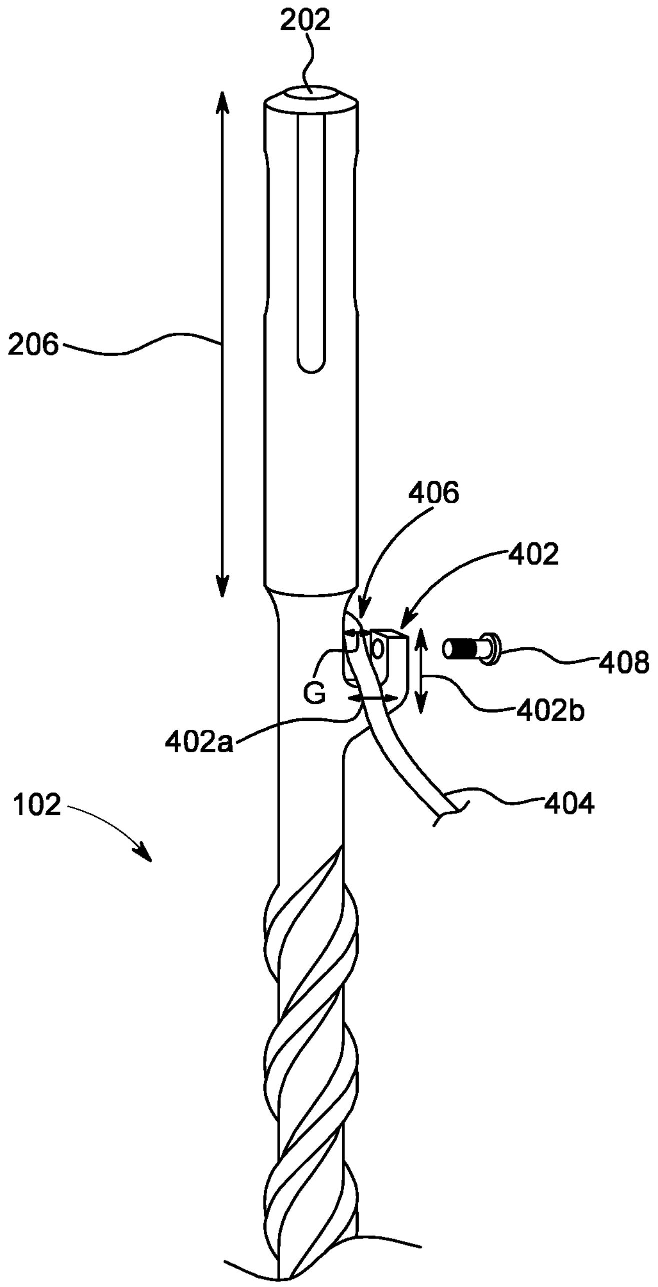
FIG. 4 depicts a clamp attached to a ground rod in accordance with the present disclosure.

FIG. 4 depicts a clamp 402 attached to the ground rod 102 in accordance with the present disclosure. In an exemplary aspect, the clamp 402 may be attached or integrated (e.g., manufactured/molded) to the top end 202 such that the clamp 402 and the rod body form a unitary structure of the ground rod 102. Stated another way, the clamp 402 may be a part of the ground rod 102. The clamp 402 may be configured to hold a ground wire 404 and secure the ground wire 404 with the ground rod 102. Although FIG. 4 depicts a single clamp, the ground rod 102 may include additional clamps without departing from the present disclosure scope.

In some aspects, the clamp 402 may be disposed in proximity to the top end 202. For example, the clamp 402 may be disposed below the shank 206 and in a rod body top portion, as depicted in FIG. 4. In some aspects, the clamp 402 may be a half U-shaped clamp or an L-shaped clamp that may extend from the rod body exterior surface (e.g., from one side). The clamp 402 may be disposed on the rod body such that the clamp 402 may form an open portion 406 between the rod body and a clamp portion (e.g., a second portion **402*b* described below). The open portion 406 may be formed at a clamp upper side, which may enable the ground wire 404 to lay in the open portion 406**.

In some aspects, the clamp 402 may include a first portion **402*a* and a second portion 402*b*. The first portion 402*a* and the second portion 402*b* may form a unitary structure of the clamp 402. In some aspects, a first portion longitudinal axis may be perpendicular to a second portion longitudinal axis, as shown in FIG. 4**. In other aspects (not shown), the first portion longitudinal axis may be disposed at a predefined angle (different from 90 degrees) relative to the second portion longitudinal axis.

The first portion **402*a* may be attached (or integrated) with the rod body exterior surface. In some aspects, the first portion longitudinal axis may be perpendicular to a rod body longitudinal axis. Further, the second portion longitudinal axis may be parallel to the rod body longitudinal axis. In some aspects, a gap "G" may exist between the second portion 402*b* and the rod body, as shown in FIG. 4. The installer 104 may dispose the ground wire 404 in the gap "G" to hold the ground wire 404 in the ground rod 102. The ground wire 404 may pass through the gap "G". In some aspects, the gap "G" may be equivalent to or greater than a ground wire thickness such that the ground wire 404** may securely lay in the gap "G".

The clamp 402 may further include an attachment mechanism 408 configured to secure the ground wire 404 in the clamp 402. In some aspects, the attachment mechanism 408 may include a bolt (hereinafter referred as bolt 408) that secures the ground wire 404 in the clamp 402. In some aspects, the second portion **402*b* may include a through-hole (or a female screw portion) that may be configured to receive the bolt 408 and secure the ground wire 404 in the gap "G". A bolt longitudinal axis may be perpendicular to the rod body longitudinal axis. The bolt 408 may include male threads on the bolt exterior surface. The male threads may engage with the female screw portion to secure the ground wire 404 in the gap "G". In some aspects, when the ground wire 404** is secured in the gap "G", a ground wire longitudinal axis may be perpendicular to the rod body longitudinal axis and parallel to the ground.

Figure 5:
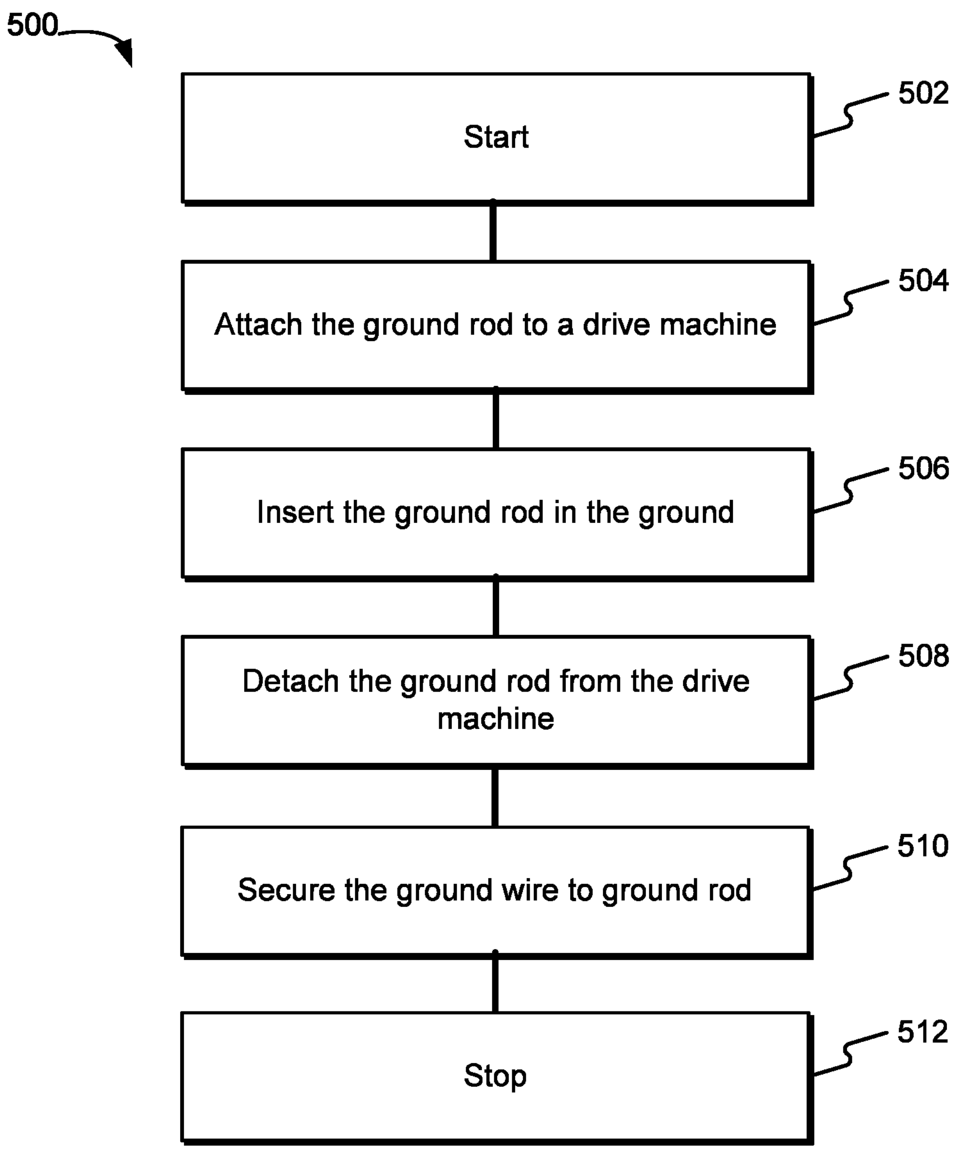
FIG. 5 depicts a flow diagram of an example method to install a ground rod in ground in accordance with the present disclosure.

FIG. 5 depicts a flow diagram of an example method 500 to install a ground rod in ground in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include attaching the ground rod 102 to the drive machine 106. Specifically, the shank 206 may be attached to the drive machine 106 to secure the ground rod 102 to the drive machine 106.

At step 506, the method 500 may include inserting the ground rod 102 in the ground by activating the drive machine 106. In some aspects, the installer 104 may activate the drive machine 106 when the ground rod 102 may be secured to the drive machine 106. When the installed 104 activates the drive machine 106, the drive machine 106 may rotate the ground rod 102 in a first predetermined direction and push the ground rod 102 in the ground. The drilling tip and the spiral portion of the ground rod 102 may enable the ground rod 102 to be easily inserted in the ground via the drive machine 106. Thus, the installer 104 may simply activate the drive machine 106 and may apply a small amount to pressure to install the ground rod 102 in the ground, and may not require pounding with a hammer. In some aspects, the drive machine 106 may further assist the installer 104 to remove the ground rod 102 from the ground. In such cases, the drive machine 106 may rotate the ground rod 102 in a second predetermined direction. The first predetermined direction may be opposite to the second predetermined direction.

At step 508, the method 500 may include detaching the ground rod 102 from the drive machine 106. Specifically, the shank 206 may be detached from the drive machine 106 and the ground rod 102 may remain in the ground.

At step 510, the method 500 may include attaching/securing the ground wire 404 to the ground rod 102. As described above, the ground wire 404 may be secured to the ground rod 102 via the clamp 402 and the bolt 408. Specifically, the clamp 402 may be a half U-shaped clamp or an L-shaped clamp, which may form the open portion 406 or the gap "G" in which the ground wire 404 may be secured. The installer 104 may insert the ground wire 404 in the open portion 406 or the gap "G" such that the ground wire 404 may pass through the open portion 406. Thereafter, the installer 104 may secure the ground wire 404 in the open portion 406 using the bolt 408, as described above in conjunction with FIG. 4.

At step 512, the method 500 ends.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A ground rod comprising:

a rod body having a top end and a bottom end; and a clamp configured to hold a ground wire, wherein the clamp is integrated at the top end to form a unitary structure of the ground rod, wherein the clamp comprises an attachment mechanism configured to secure the ground wire in the clamp, wherein the attachment mechanism comprises a bolt that secures the ground wire in the clamp, and wherein a bolt longitudinal axis is disposed perpendicular to a rod body longitudinal axis.

2. The ground rod of claim 1, wherein the bottom end is made of a material with an associated tensile strength greater than a predefined threshold.

3. The ground rod of claim 1, wherein the bottom end is made of carbide.

4. The ground rod of claim 1, wherein the rod body comprises a shank, and wherein a cross-section of the shank is hexagonal in shape.

5. The ground rod of claim 1, wherein the rod body comprises a spiral portion disposed between the top end and the bottom end, and wherein the spiral portion covers a predetermined length of the rod body.

6. The ground rod of claim 5, wherein the spiral portion is made of copper clad steel.

7. The ground rod of claim 1, wherein the clamp is a half U-shaped clamp.

8. A ground rod comprising:

a rod body having a top end and a bottom end, wherein the rod body comprises a spiral portion disposed between the top end and the bottom end, and wherein the spiral portion covers a predetermined length of the rod body; and a clamp configured to hold a ground wire, wherein the clamp is integrated at the top end to form a unitary structure of the ground rod, wherein the clamp comprises an attachment mechanism configured to secure the ground wire in the clamp, wherein the attachment mechanism comprises a bolt that secures the ground wire in the clamp, and wherein a bolt longitudinal axis is disposed perpendicular to a rod body longitudinal axis.

9. The ground rod of claim 8, wherein the bottom end is made of a material with an associated tensile strength greater than a predefined threshold.

10. The ground rod of claim 8, wherein the bottom end is made of carbide.

11. The ground rod of claim 8, wherein the rod body comprises a shank, and wherein a cross-section of the shank is hexagonal in shape.

12. The ground rod of claim 8, wherein the spiral portion is made of copper clad steel.

13. The ground rod of claim 8, wherein the clamp is a half U-shaped clamp.

14. A method to install a ground rod in ground, the method comprising:

attaching the ground rod to a drive machine, wherein the ground rod comprises:

a rod body having a top end and a bottom end; and a clamp configured to hold a ground wire, wherein the clamp is integrated at the top end to form a unitary structure of the ground rod, wherein the clamp comprises an attachment mechanism configured to secure the ground wire in the clamp, wherein the attachment mechanism comprises a bolt that secures the ground wire in the clamp, and wherein a bolt longitudinal axis is disposed perpendicular to a rod body longitudinal axis;

inserting the ground rod in the ground by activating the drive machine; and detaching the ground rod from the drive machine responsive to inserting the ground rod in the ground.

15. The method of claim 14, wherein attaching the ground rod to the drive machine comprises attaching the top end to the drive machine.

16. The method of claim 14 further comprising securing the ground wire in the clamp via the attachment mechanism of the clamp.

* * * * *